(12) United States Patent
Francis

(10) Patent No.: US 6,846,358 B2
(45) Date of Patent: Jan. 25, 2005

(54) FIRE DOOR CORE

(75) Inventor: Hubert C. Francis, Lithonia, GA (US)

(73) Assignee: Georgia-Pacific Gypsum, Inc., Atlanta, GA (US)

(*) Notice: Subject to any disclaimer, the term of this patent is extended or adjusted under 35 U.S.C. 154(b) by 0 days.

(21) Appl. No.: 10/423,015

(22) Filed: Apr. 25, 2003

(65) Prior Publication Data

US 2004/0211338 A1 Oct. 28, 2004

(51) Int. Cl.⁷ .................. C04B 14/18; C04B 28/04; C04B 28/06
(52) U.S. Cl. .................. 106/695; 106/675; 106/698; 106/DIG. 2; 52/309.15; 52/309.17; 52/784.11; 156/39; 264/333; 428/294.7; 428/537.7; 428/703; 428/921
(58) Field of Search .................. 52/309.15, 309.17, 52/784.11; 106/676, 695, 698, DIG. 2, 675; 156/39; 264/333; 428/294.7, 537.7, 703, 921

(56) References Cited

U.S. PATENT DOCUMENTS

| | | |
|---|---|---|
| 3,015,626 A | 1/1962 | Kingsbury |
| 3,203,813 A | 8/1965 | Gajardo et al. |
| 3,793,042 A | 2/1974 | Jacobs et al. |
| 3,989,534 A * | 11/1976 | Plunguian et al. .......... 106/646 |
| 4,000,241 A | 12/1976 | Dunn |
| 4,159,302 A * | 6/1979 | Greve et al. ................ 264/333 |
| 4,161,855 A | 7/1979 | Mulvey et al. |
| 4,303,450 A | 12/1981 | Hacker |
| 4,336,068 A | 6/1982 | Vogel et al. |
| 4,518,652 A | 5/1985 | Willoughby |
| 4,748,771 A * | 6/1988 | Lehnert et al. ............. 49/399 |
| 5,234,497 A | 8/1993 | Crocker |
| 5,256,222 A | 10/1993 | Shepherd et al. |
| 5,601,919 A * | 2/1997 | Symons ..................... 428/375 |
| 5,641,584 A | 6/1997 | Andersen et al. |
| 5,723,226 A | 3/1998 | Francis et al. |
| 6,171,388 B1 | 1/2001 | Jobbins |
| 6,290,769 B1 * | 9/2001 | Carkner ..................... 106/675 |
| 6,340,389 B1 | 1/2002 | Klus |
| 6,554,893 B2 * | 4/2003 | Klus .......................... 106/675 |
| 6,645,289 B2 * | 11/2003 | Sobolev et al. ............. 106/705 |
| 6,648,965 B2 * | 11/2003 | Klus .......................... 106/772 |
| 2002/0139082 A1 * | 10/2002 | DeFord et al. ............. 52/783.1 |
| 2003/0089061 A1 * | 5/2003 | DeFord et al. ............. 52/309.9 |

FOREIGN PATENT DOCUMENTS

| | | |
|---|---|---|
| AU | B-47113/85 | 12/1989 |
| EP | 0 031 256 | 12/1980 |
| EP | 0 106 246 | 9/1983 |
| FR | 2 803 591 | 1/2000 |
| GB | 1185141 | 3/1970 |
| GB | 1393899 | 5/1975 |
| WO | WO 91/03438 | 3/1991 |

OTHER PUBLICATIONS

International Search Reported dated Jul. 16, 2004.

Minoru Takehiro, et al. "Quick Setting Property and Hydration of Portland Cement with Accelerating Agent Based on Calcium Aluminate", Soc. Mat. Sci. Japan, vol. 49, No. 2, pp. 209–214, Feb. 2000. (Note: English translation attached).

T. Gabor, et al., "Perlite–Based Heat–Insulating Foam", 6001 Chemical Abstracts 116 Apr. 20, 1992, No. 16, Columbus, Ohio, U.S. abstract of HU 56/800 (Oct. 1991).

H. Taro, et al., "Manufacture of Fire and Waterproof Sound and Thermal Insulators", Chemical Abstracts 115 Oct. 21, 1991, No. 16, Columbus, Ohio, U.S. abstract of JP 03–122068 (May 1991).

H. Jaroslav, et al., "Fireproof Coatings", Chemical Abstracts 82 May 5, 1975, No. 18, Columbus, Ohio, abstract of Czech 154,727 (Sep. 1974).

Information Series Rinker Materials "Types of Portland Cement", pp. 1–2, (no date).

U.S. Department of Transportation Federal Highway Administration Infrastructure, "Portland Cement", pp. 1–8, (no date).

Incon Corporation "Perlite Data Sheet", Perlite Origin and Characteristics, p. 1, (Nov. 2001).

* cited by examiner

Primary Examiner—Anthony J. Green
(74) Attorney, Agent, or Firm—Banner & Witcoff, Ltd.

(57) ABSTRACT

The present invention describes an improved building material composition, useful for example as a fire door core and to improved methods of making this composition. The building material of the present invention is prepared from an aqueous mixture of expanded perlite and a fast setting, cementitious composition consisting essentially of a hydraulic cement having (1) a Portland cement and (2) a calcium aluminate cement, which composition can be molded and shaped into a fire door core.

12 Claims, No Drawings

FIRE DOOR CORE

TECHNICAL FIELD

This invention is in the field of building materials, especially fire-resistant building materials. Specifically, this invention describes a building material constituting a fast setting cementitious composition having utility as an improved core construction for fire doors and methods of manufacturing the improved fire door core.

BACKGROUND OF THE INVENTION

Fire doors are generally made for the purpose of stopping or delaying the transfer of thermal energy (i.e., heat), from one side of the door to the other side. Current fire-resistant doors generally contain a fire-resistant core usually encased in a door-shaped shell, wherein the shell is made from various materials generally known to those of ordinary skill in the art. The core is customarily bonded or glued to both inside surfaces of the shell.

Fire doors, as used in residential, commercial, and industrial applications, typically are employed in conjunction with fire walls to provide fire protection between different zones of a structure, and particularly to isolate high fire risk areas of a building from the remainder of the structure, such as the garage of a dwelling from its living quarters. Fire doors usually are not capable of indefinitely withstanding the high temperature conditions of a fire but, rather, are designed to maintain the integrity of the firewall for a limited time to permit the occupants of a building to escape and to delay the spread of fire until fire control equipment can be brought to the scene.

Various tests have been designed for fire doors and are based on factors, such as the time that a given door would withstand a certain temperature while maintaining its integrity, and hose stream tests which involve the door's ability to withstand the forces of a high pressure water stream. The American Society for Testing Materials (ASTM) has devised tests to establish fire door standards and these standards are incorporated into building codes and architectural specifications. One such standard, ASTM Method E 152, requires a door to maintain its integrity for period ranging up to 1.5 hours while withstanding progressively higher temperatures and erosive effects of a high pressure stream of water from a fire hose at the conclusion of the heat (fire) exposure.

Considerations in fire door design, in addition to retarding the advance of fire, include the cost of raw materials and the cost of fabrication. Furthermore, the weight of the door is important, both from the standpoint of ease of handling and cost of transportation. The strength of the door is also a significant factor, since fire doors must pass the above-described water stream test as well as have the requisite strength to withstand normal use and abuse.

Fire-resistant doors have been made using a variety of constructions and utilizing a number of different materials, including wood, metal, and mineral materials. Early forms of fire doors simply comprised wooden cores faced with metal sheeting. Although wood of ample thickness is an effective fire and heat retardant, doors of such construction tend to be heavy and are expensive to fabricate and transport.

Mineral fibers have also been employed in the manufacture of fire doors. The core of a commercial metal fire door principally comprises a composition including mineral fibers and a binder. Such doors suffer, however, from a lack of strength, and handling the friable cores results in the production of irritating dust particles during the manufacturing process.

Current fire-resistant cores are generally constructed using such materials as perlite (which functions as an inorganic filler), gypsum (which functions as the fire resistant material), cement (which functions as a further fire resistant material and counteracts shrinkage of the core), a solution of polyvinyl alcohol and water (which also acts as a binder and increases the viscosity of the mixture of ingredients while also hydrating the gypsum) and fiberglass (which functions as a reinforcing material). See for example U.S. Pat. No. 4,159,302, the disclosure of which is incorporated herein by reference.

It has also been proposed to make fire doors wherein the core comprises particles of expanded perlite, which are bound together by the use of various hydraulic binders including gypsum, cement, and inorganic adhesive material. In order to provide sufficient strength, particularly to withstand handling of the core during manufacture, the core typically is compressed to compact the mixture to a relatively high density, resulting in a heavy door.

Other fire doors have included conventional gypsum wallboard panels as a core material. However, in order to produce sufficient fire resistance, the thickness required of the wallboard is such as to result in an excessively heavy door. Furthermore, internal structural members such as rails or mullions have been found necessary to support and strengthen wallboard panels. The need for such reinforcing elements increases the cost of materials and assembly of such doors. In addition to the above-mentioned considerations, fire doors must, in order to be commercially acceptable, also have other properties that are related to the manufacture, installation and service of the fire door.

Fire door cores that contain a significant proportion of gypsum may lose their fire resistant capabilities in the course of a fire. As is well known, gypsum calcines when contacted with sustained heat. During a fire, calcination of the gypsum in a door core may cause the core to lose strength and integrity, especially when thereafter exposed to water, such as a high pressure stream of water from a hose. Thus, the fire resistance and structural integrity of such a door core is degraded. Furthermore, current fire-resistant door cores containing gypsum exhibit high water absorption rates thereby increasing both their size and density.

U.S. Pat. No. 6,340,389 describes a fire door cores made from expanded perlite, a fireproof binder such as an alkali metal silicate, fire clay or vermiculite, and optionally one or more viscosity-enhancing components, fiberglass, or both. The fire door core is made using a semi-continuous batch press method wherein water, the expanded perlite, the fireproof binder, fire clay or vermiculite are mixed; and the wet mixture is compressed in a mold, and the compressed mixture dried.

There exists a commercial need for building materials suitable for use as a door core that not only is fire-resistant, but also closer to being fire-proof. In order to meet this commercial need, the door core must maintain its strength and integrity after being exposed to heat. Additionally, in order to be commercially viable the door core must be easily manufactured using techniques well-known in the art, and have improved hose stream resistance after heat exposure. The present invention fulfills these commercial needs by using a fast setting cementitious composition as the major structural component.

SUMMARY OF THE INVENTION

The present invention is directed to a building material composition useful as a fire door core. Building material compositions (e.g., fire door cores) of the present invention can meet or exceed the fire-resistant capabilities of current fire door cores. The building material composition (e.g., fire door core) of the present invention is substantially free of set gypsum. The building material composition (e.g., fire door core) of the present invention comprises as its main constituent expanded perlite and as a second, normally minor, essential constituent, a cured fast setting, cementitious composition. The ingredients used to prepare the building material composition, upon hydration with water, can be molded, shaped and cured into a fire door core. The fast setting cementitious composition constituent consists essentially of a dry mixture of two hydraulic cement components, a first Portland cement constituent and a second calcium aluminate (Fondu) cement constituent. Upon being mixed with water in an amount within the range of about 15 to 60 percent by weight, more usually within the range of about 15 to 25 wt. %, and most often within the range of about 19 to 23 wt. %, of the dry mixture of the constituents, the resulting moist composition exhibits a suitable setting time for manufacturing door cores.

The fire door core may also contain, as minor optional components, an organic binder, most preferably polyvinyl alcohol (polyvinyl acetate which is substantially fully hydrolyzed), an alkali metal silicate, unexpanded vermiculite, clay and fibrous reinforcements, most preferably chopped glass fibers.

Preferably, the Portland cement component and the calcium aluminate cement component of the fast setting cementitious composition constituent are present in a weight ratio within the range of about 4:1 to 8:1 and more preferably, within the range of about 5:1 to 7:1.

The fire door core can be made by admixing expanded perlite, the fast setting, cementitious composition, any organic binder, and other optional additives which may also be used, in the presence of an amount of water at least sufficient to provide a moist, (damp) mixture of the ingredients and sufficient to set the fast setting cementitious composition. Water usually can be added in an amount of between about 15 to 25 wt. % of the dry ingredient in the composition. The composition can then be molded into the desired shape, density and thickness for the fire door core.

DETAILED DESCRIPTION OF THE INVENTION

The building material composition, preferably in the form of a fire door core, of the present invention comprises as a major component expanded perlite and as a second, generally minor, component a cured fast setting cementitious composition which consists essentially of (1) a Portland cement component and (2) a calcium aluminate cement component.

The main constituent of the fire door core of the present invention is expanded perlite. Expanded perlite is present in the door core in an amount of about 50 to 75 weight percent. Expanded perlite is available in various forms as well known to those of ordinary skill in the art. Speaking generally, expanded perlite can be formed by heating moisture-containing, natural-ocurring perlite ore at a temperature within the range of about 1,500° to 2,000° F. (815° to 1093° C.) Such heat treatment explodes or expands the perlite to, for example, 15–20 times its original volume. Commercially available forms of expanded perlite known as cryogenic, plaster and concrete aggregate are exemplary of materials that can be used in the practice of the present invention. Expanded perlite, suitable for use in the present invention, has a density from about 5 to about 11 lbs per cubic foot.

The particle size of the expanded perlite can vary over a wide range. Expanded perlite having a particle size distribution as set forth below is exemplary.

| Mesh U.S. Standard Sieve Series) | % Retained |
|---|---|
| 30 | 24 |
| 50 | 73 |
| 100 | 93.5 |

It should be understood that expanded perlite of different particle size distribution also can be used in the practice of the present invention.

The expanded perlite functions as a non-combustible, compactable filler which imparts lights weight to the set (cured) composition, and also relatively high strength as compared to other means which could be used to impart light weight to the set composition, for example, such as by introducing air voids into the set composition by foaming the mixture of ingredients from which the set composition is made.

To optimize strength properties of the core, those forms of expanded perlite which are more resistant to being compressed or compacted than other forms are preferably used. It has been observed that various forms of perlite are less spongy than others. The less spongy the perlite, the greater its resistance to being compressed and the greater the anticipated strength of the core. Conversely, the more spongy the perlite, the more readily it is compressed and the lower the anticipated strength of the core. See U.S. Pat. No. 4,159,302 for additional discussion.

While generally present as a minor component, the fast setting cementitious composition, which consists essentially of (1) a Portland cement component and (2) a calcium aluminate cement component, does constitute the principal constituent holding the composition together as a unitary construction. The set or cured fast setting cementitious composition is present in the door core in an amount of 20 to 50 weight percent.

Portland cements represent a class of hydraulic cements that contain a substantial quantity of calcium silicate with only minor quantities of aluminates, namely, tricalcium aluminate and a calcium aluminoferrite. Portland cements are produced by heating, to incipient fusion, an intimate mixture of calcareous and argillaceous, or other siliceous, aluminious, and iron-oxide-bearing materials so as to form a clinker. The clinker then is pulverized and a small amount of calcium sulphate, usually gypsum, is added to improve the setting characteristics of the finished cement.

Portland cements are commonly characterized by type in accordance with standards developed by the American Portland Cement Association and the standards and designations applied there are used in characterizing Portland cements herein (Types I, IA, II, IA, III, IIIA, IV and V). The Portland cement constituent of the present invention can be anyone of these wide variety of Portland cement types, though the normal general purpose Type I Portland cement is usually suitable. As noted, such cements principally contain calcium silicate and have a relatively low alumina content, i.e., less than 10 wt. %. If desired blended hydraulic cements, made by blending Portland cement with such additives as ground blast furnace slag, fly ash natural pozzolans and silica flume, available as Types IP, P IS, S, I(PM) and I(SM) cements, and even expansive cements, available as Types E-1 (K), (M) and (S), can be used, but the added expense associated with such materials is generally not warranted. Portland cement compositions typically contain more than 60% CaO and less than 3% aluminum and 1.5% sulfur.

The second component of the fast setting cementitious composition constituent is a calcium aluminate cement, also referred to as a high alumina cement and Fondu cement. The calcium aluminate cement component has a high alumina content, usually at least about 30 wt. %, as contrasted with Portland type cements which contain less than about 10 wt. %, and usually less than 5 wt % alumina. The alumina is typically supplied by the inclusion of bauxite during the manufacture of the cement, and typically, a calcium aluminate cement is formed by the sintering of clinkers of limestone and bauxite with small amounts of silica and other materials such as titanium oxide and iron oxide. For a further description of calcium aluminate cements, please refer to U.S. Pat. No. 4,033,782, the entire disclosure of which is incorporated herein by reference.

Calcium aluminate cements and Portland cements are both designated "hydraulic cements" but the two cements differ substantially in chemical composition and in response to additives used to effect setting and hardening by hydration of the cement.

The Portland cement component (PC) and the calcium aluminate cement component (CAC) are present in the fast setting cementitious composition constituent in a weight ratio (PC:CAC) within the range of about 4:1 to 8:1 and more preferably, within the range of about 5:1 to 7:1. A preferred formulation includes Portland cement in a weight ratio to the calcium aluminate cement of about 6:1.

The set cementitious composition imparts to the fire door core good water resistant properties and high compressive strength. Accordingly, the set cementitious composition aids greatly in maintaining the integrity of the fire door core when the door is exposed to the wetting and the pressure of a hose stream. In addition, the set cementitious composition functions as a shrink resistant material in the core when it is exposed to fire.

The building material composition, e.g., fire door core, of the present invention does not require set gypsum as a main structural component and thereby avoids problems associated with current compositions used as door cores which rely primarily on set gypsum, i.e., the door core is substantially free of set gypsum. In fact, the building material composition of this invention is preferably free from gypsum altogether. Current door cores that contain gypsum cannot be considered fire-proof; at best, they can only be considered fire-resistant. Fire door cores, that contain gypsum as a structural component, have the problem that, when subjected to extended heating, the gypsum calcines and the door core loses its strength and integrity. Thus, when the door core thereafter is contacted by water, typically in the form of a high pressure steam of water from a hose, the integrity of the door is compromised because the calcined gypsum is washed away. The fire door core of the present invention is expected to meet or exceed the capabilities of current fire-resistant cores made with set gypsum in standard fire tests for residential and non-residential use. The fire door core of the present invention also is expected to exceed the capabilities of fire-resistant door cores containing set gypsum in maintaining strength and integrity following prolonged heat, even when exposed to water.

The building material composition, especially the fire door core, of the present invention can also optionally include, and preferably does contain, still additional components, particularly an organic binder, to achieve desired flexural and compressive strength and general handling characteristics. While desired strength characteristics can be achieved without the use of the organic binder and by using relatively higher amounts of the fast setting cementitious composition, this increases the density of the product. Thus, use of an organic binder often is preferred.

The organic binder can be a naturally-occurring material or a synthetic material. Examples of the former include starches, dextrins and gums. Examples of synthetic materials are resins such as polyvinyl alcohol, polyvinyl acetate, polymers of vinyl acetate and ethylene, polymers of styrene and butadiene, and acrylic resins.

The organic binder is typically a material which is dispersible or soluble in water. The preferred organic binder is polyvinyl alcohol, a well known commercially available material. Speaking generally, polyvinyl alcohol is prepared by hydrolyzing polyvinyl acetate. The source of the polyvinyl alcohol is preferably a substantially completely hydrolyzed form of polyvinyl acetate, that is, about 97 to 100% hydrolyzed polyvinyl acetate. The polyvinyl alcohol is cold-water insoluble. Solutions can be prepared at elevated temperatures, for example, at temperatures of about 140° to 205° F. (60° to 96° C.). Commercially available polyvinyl alcohols for use in the composition of the present invention are available from the Dupont Company under the trademark "Elvanol" Examples of such products are Elvanol, Grades 90-50, 71-30, 72-60 and 70-06.

Still other optional ingredients also may be included in the fire door construction, such as unexpanded verimculite (to enhance fire resistant properties of the set composition and to counteract any tendency to shrink at elevated temperatures thereby imparting improved dimensional stability properties to the set composition during exposure to heat), clay, (to improve fire resistant and high temperature, dimensional stability properties), fibrous reinforcements (to impart flexibility and impact-resistant properties to the set composition, and also better handling properties to improve resistance to cracking or breakage during shipment or processing), and a defoamer. These optional additional ingredients do not prevent the composition from fulfilling, and in most cases enhance, its use in fire resistant applications.

Clays are natural earthy, fine-grained materials, most of which exhibit plastic characteristics when moistened with limited amounts of water. In general, clays comprise primarily alumina, silica and water and may also contain to a lesser extent iron, alkali, alkaline earth and other metals. The various types of clays in general have particles ranging in size from fractions of a micron to about 40 microns, although some materials having particles of an even larger size are also considered clays. It should be understood that materials which do not have all of the above characteristics, but which nevertheless are generally referred to as clays because they have one or more of the above characteristics are included within the term "clay" as used herein. Examples of the types of clay that can optionally be utilized are: bentonite—comprised mainly of the clay mineral montmorillonite; attapulgite—clays which contain magnesium aluminum silicates; and kaolinitic clays—including, for example, kaolin (also referred to as china or paper clays), ball clay, fireclay, and flint clay, which clays are comprised predominantly of the clay mineral kaolinite. Other of the various types of clays that contain mixtures of various proportions of clay minerals, such as for example, illite, chlorite, kaolinite and montmorillonite, as well as non-clay materials, may also be used. Preferred clays for use in the practice of the present invention include kaolinite, attapulgite and bentonite.

As fibrous reinforcements glass fibers are preferred. Examples of other fibrous reinforcements that can be substituted for glass fibers or used in combination therewith are sisal fibers, graphite, and synthetic fibers such as, for example, polyolefin fibers, such as polyethylene fibers and polypropylene fibers, rayon fiber and polyacrylonitrile fiber. The fiber reinforcement may improve the material handling properties of the wet mixture, e.g., the wet door core mixture and especially the wet composite, e.g., the wet door core. Typically, when used, the amount of fiber reinforcement is less than about 2 percent, such as from 0.1 to 2 percent, usually less than about 1 percent, such as from 0.1 to 1 percent, more usually, from about 0.2 to bout 0.7 percent, each of these percents based on the weight of the dry ingredient sed to form the building material composition, e.g., the fire door core.

The building material composition when used as a fire door core in accordance with the present invention is expected to provide several advantages over current fire-resistant door cores, including but not limited to, increased production capabilities using methods known to those of ordinary skill, decreased raw material consumption, stronger adhesion to door shells, increased tensile and flexural strength, superior hose stream resistance, decreased weight, and better shaping and handling characteristics.

The phrase "consisting essentially of" when used in connection with the present invention and in the claims is intended to exclude not only the use of ingredients that would destroy the fire resistant property of the composition, but also to exclude the use of gypsum in amounts in excess of about 5% by weight and preferably in excess of about 1% by weight.

As to amounts of ingredients utilized in the practice of the present invention, the set composition comprises the set product of an aqueous mixture, based on the total weight of the dry ingredients in the mixture, of:
(A) about 50 to about 75 wt. % of expanded perlite;
(B) about 20 to about 50 wt. % of the fast setting cementitious composition;
(C) up to 5% and preferably about 1 to about 5 wt. % of an organic binder,
(D) 0 to about 4 wt. % of unexpanded vermiculite;
(E) 0 to about 4 wt. % of clay; and
(F) 0 to about 1 wt % of fibrous reinforcements.

In preferred form, the aforementioned aqueous mixture includes, based on the total weight of the dry ingredients in the mixture:
(A) about 50 to about 55 wt % perlite;
(B) about 30 to about 40 wt. % of the cementitious composition;
(C) at least about 1.5 wt. % of an organic binder;
(D) at least about 1.5 wt. % of vermiculite;
(E) at least about 1.5 wt % of a clay; and
(F) at least about 0.2 wt. % of a fibrous reinforcement.

The building material composition, e.g., fire door core, of the present invention is manufactured by combining the dry components with water to form a wet mixture, e.g., a wet door core mixture. The amount of water to use in making a set door core is at least sufficient to provide the stoichiometric amount of water needed to cause the setting (curing) of the cementitious composition. It is generally desirable to include an amount of water in excess of the stoichiometric amount. In certain embodiments, it may be preferred to use only an amount of water sufficient to provide a damp (moist) mixture of the ingredients. In alternative embodiments, higher amounts of water can be used, for example, amounts that produce a slurry of the dry, solid ingredients. In most cases, a set door core can be prepared readily using from about 15 to about 60% by weight of water based on the weight of the dry ingredients comprising the mixture. Usually an amount of water in the range of about 15 to 25 wt. %, more usually within the range of 19 to 23 wt. %, of the dry mixture, should be suitable for preparing the wet door core mixture.

The wet mixture, e.g., the wet door core mixture, then is molded and pressed to form a wet composite, e.g., a wet door core. The wet composite, e.g., wet door core, then is dried to form the building material composition, e.g., the fire door core, of the invention.

As described herein, the wet mixture, e.g., the wet door core mixture, and the wet composite, e.g., wet door core, preferably have a solids concentrations, and resultant viscosities, that provide ease of handling, i.e., the solids concentrations are not so high as to be difficult to mix or transfer from mixer to the mold, and is not so low as to yield a wet composite, e.g., a wet door core, that lacks dimensional stability. Therefore, the form, i.e., whether a solid or an aqueous solution, of an individual component used in preparing the mixture from which the building material composition is prepared, typically is selected so that the solids concentration of the wet mixture, e.g., the wet door core mixture and the wet composite, e.g., the wet door core, need not be adjusted. However, additional water may be added to obtain a wet mixture, e.g., a wet door core mixture and then a wet composite, e.g., a wet door core, having a desired viscosity, if necessary.

An alkali metal silicate can also be used as an optional ingredient in the mixture for forming the building material composition. The alkali metal silicate can be used in an amount of from 0% up to about 15 percent of the weight of the mixture of dry ingredients used to prepare the composition, e.g., of the fire door core. Preferably, the alkali metal silicate is sodium silicate or potassium silicate, more preferably it is sodium silicate. Sodium silicate used in the fire door core of the invention typically has a molar ratio of silica to sodium oxide of from about 2.5:1 to about 4:1. Preferably, the ratio of silica to sodium oxide is about 3.22:1. When used, the sodium silicate is provided to the mixture generally as an aqueous solution. The solids concentration in this aqueous silicate solution (along with any additional water used to make the wet mixture of ingredients for forming the fire door composition) must yield a wet composite, e.g., a wet door core, that is easy to handle, both during molding operations and after the wet composite, e.g., the wet door core, is removed from the mold, and is economically dried.

Typically, the solids content of sodium silicate solution optionally used in this invention is between about 30 and about 50 weight percent, more usually between about 34 and 44 weight percent, and most often about 37 weight percent solids. Silicate solutions having lower or higher solids concentrations also can be used. A commercial example of a solution of sodium silicate and water is 'N' grade sodium silicate solution marketed by PQ Corporation of Valley Forge, Pa. This solution has a molar ratio of silica to sodium oxide of 3.22:1 and a solids concentration of 37 weight percent.

Optionally, one or more dispersing agents or plasticizers can be used in combination with the optional alkali silicate additive for producing the building material composition, e.g., the fire door core, of the present invention to facilitate processing of the wet mixture. Specific concentrations, amounts, and identity of the optional dispersing agent or plasticizer will be apparent to skilled practitioners who recognize that these parameters will vary depending on external preferences such as price and availability of the additional components and that the described embodiments do not limit the scope of the claimed invention.

Use of a dispersing agent or plasticizer also may enhance certain physical properties of the building material composition, e.g., certain properties of the fire door core, such as flexibility and toughness. It may be possible to use inexpensive plasticizers such as sugar and sorbitol, though conventional, and generally more costly synthetic organic materials known for their plasticizing effect, such as Melment, and DAXDAD materials, can also alternatively be used. Such other materials will be readily recognized by those skilled in the art and are commercially available from a number of suppliers.

A plasticizer, if used, would also generally be added to the formulation in an amount of about 0.1 to 4 wt. percent, more usually about 1 to 2 wt. percent, of the weight of the building material composition (that is percent by weight of the solids used in forming the composition).

The building material composition, e.g., the fire door core of the present invention may contain still other optional components as long as these other components do not adversely affect the advantageous properties, especially the fire resistant property, of the composition, e.g., the fire resistant property of the fire door core, of the present invention. Another optional ingredient is diatomaceous earth. Diatomaceous earth is predominately silica and is composed of the skeletal remains of small prehistoric aquatic plants related to algae (diatoms). Particles of diatomaceous earth typically have intricate geometric forms. The irregular particle shapes are believed to improve the overall binding of the composition together and the resultant strength of the composition. Generally, the amount of such other optional components, such as the diatomaceous earth is less than about 20 weight percent of the building material composition, e.g., the fire door core. In the case of the diatomaceous earth in particular, when used the diatomaceous earth will generally be used in an amount of from about 1 to 10 weight percent, more usually from about 2 to about 8 weight percent and most often from about 3 to about 6 weight percent of the building material composition, e.g., the fire door core. The amount of these optional components is preferably less than about 20 weight percent, even more preferably the amount is less than about 10 weight percent.

The continuous roll press method is a known process of making fire door cores. Illustrative of the known roll method is the method described in U.S. Pat. No. 5,256,222. A non-solid mixture of the components of the fire door core is deposited onto a moving web drawn from a supply roll by pull rolls. Then, another moving web drawn from its own supply roll by pull rolls is directed by guide and press roll onto the top of the mixture. The thickness of the sandwich of fire door core mixture and webbing then is reduced to a desired value. The roll molded fire door core then is transported by known industrial methods to a drying area. The drying of the roll molded fire door core can be achieved at ambient temperature or by using drying equipment that operates at a temperature greater than room temperature.

In accordance with a semi-continuous batch press mold method, the ingredients of the building material composition, e.g., the fire door core, are mixed in a mixing device to produce the wet mixture, e.g., the wet door core mixture. Mixing devices suitably used in this step of the process are well known to skilled practitioners. Preferably, the dry ingredients are mixed with an amount of water no greater than that required to provide a damp (moist) mixture of the ingredients and then molding and compressing the damp mixture to form the core as described below. It is preferred that the ingredients of the composition, e.g., the fire door core ingredients, be mixed in a manner such that the expanded perlite is substantially unbroken. In order to substantially eliminate the breaking of the expanded perlite during mixing, preferably the other components of the composition, e.g., the other fire door core ingredients, are mixed together first. This allows the expanded perlite to thoroughly blend with the other ingredients with a minimum of mixing. The amount of expanded perlite broken during the mixing process can be determined by comparing the volume of the wet mixture, e.g., the wet door core mixture before and after mixing.

The wet mixture, e.g., the wet door core mixture then is transferred to a mold having a shape corresponding to desired composite dimensions. The transfer step can be accomplished using any of the techniques well known to skilled practitioners. The wet mixture, e.g., the wet door core mixture then is compression molded to compact the mixture to the desired density and thickness to produce a wet composite, e.g., a wet door core.

The press molding of the present invention can use any means of pressure well known to those of skilled practitioners and suitable equipment is well known to the skilled worker. Typically, the amount and length of pressure applied is sufficient to bind the ingredients together in a composition, e.g., in a door core, that has a density from about 22 to about 35 pounds per cubic foot, more usually about 24 to about 31 pounds per cubic foot, after drying, while at the same time being insufficient to break a significant number of the expanded perlite particles. It is expected that satisfactory results will be obtained by compressing the damp mixture to about 25 to about 33% of its original volume, utilizing pressures within the range of about 90 to about 170 psi for about 15 to about 55 seconds. As skilled practitioners will recognize the exact pressure and time required will vary for different embodiments of the present invention and suitable pressure and time schedules can be determined using routine testing. The wet composite, e.g., the wet door core then is transferred to a drying area.

The wet composite, e.g., wet door core, then is dried (cured) to produce the building material composition, e.g., the fire door core of the present invention. The wet composite, e.g., the wet door core is cured (i.e., dried) at a temperature and for a time sufficient to substantially eliminate excess water from the wet composite, e.g., from the wet door core. Although the drying can be accomplished at ambient temperature, drying at elevated temperatures may often be preferred. For example, drying of the wet composite, e.g., the wet door core, is carried out at a temperature from about 150° to about 300° Fahrenheit (about 65° to 150° C.), for a time from about 4 to about 8 hours, with lower temperatures requiring longer times. Skilled practitioners recognize that specific curing times and temperatures will depend on the exact composition of the wet composite, e.g., the wet door core and suitable temperature and time schedules can be determined using routine testing.

After the core has been dried, finishing operations can be effected. For example, the core can be sanded to a thickness within the required tolerance, sawed or shaped as desired.

The nature of the dried material is such that finishing operations can be performed readily.

During the course of finishing operations such as sanding and sawing, core dust is produced. In accordance with this invention, it is anticipated that the dust can be used in preparing other cores by including it in the mixture from which the core is made. This is advantageous because it makes use of a material that would otherwise be waste requiring disposal. The use of core dust is expected to increase the density of the core. Accordingly, the maximum amount of core dust used will be governed by the desired density of the core. It is recommended that the core dust comprise no more than about 6 wt. % of the total weight of the dry mixture of ingredients. Preferably, the core dust should comprise no more that about 2 to about 4 wt. % of the mixture.

The following non-limiting example further illustrates the invention.

EXAMPLE 1

A door core of the present invention of the following composition can be manufactured from a mixture of the following ingredients:

| Ingredients | Amount (dry weight percent) |
| --- | --- |
| Expanded perlite | 55.2 |
| Fast setting cementitious composition PC:CAC of 6:1 | 37.2 |
| Polyvinyl alcohol | 3.2 |
| Unexpanded vermiculite | 2.1 |
| Clay | 2.1 |
| Glass fibers | 0.2 |

Water in an amount of about 18 weight percent of the dry ingredients should be added and the door core can be produced by pressing at about 150 psi and drying (curing) the pressed core at about 250° F. (120° C.) for about 4–5 hours.

It will be understood that various changes in the details, materials and arrangements of parts which have been herein described and illustrated in order to explain the nature of the invention, may be made by those skilled in the art within the principle and scope of the invention as expressed in the appended claims. Unless otherwise specifically indicated, all percentages are by weight. Throughout the specification and in the claims the term "about" is intended to encompass + or −5%.

I claim:

1. A moldable composition useful for producing a fire door core comprising an aqueous mixture of expanded perlite and a fast setting, cementitious composition consisting essentially of a hydraulic cement having (1) a Portland cement and (2) a calcium aluminate cement, wherein the Portland cement (PC) and the calcium aluminate cement (CAC) are present in the fast setting cementitious composition in a weight ratio (PC:CAC) within the range of 4:1 to 8:1.

2. The composition of claim 1 containing an organic binder.

3. The composition of claim 2 wherein the Portland cement and the calcium aluminate cement are present in the fast setting cementitious composition in a weight ratio (PC:CAC) within the range of 5:1 to 7:1.

4. A building material composition useful as a fire door core, comprising a cured aqueous moldable mixture of expanded perlite, a fast setting, cementitious composition consisting essentially of a hydraulic cement having (1) a Portland cement and (2) a calcium aluminate cement, and an organic binder, wherein, the expanded perlite comprises about 50 to about 75 weight percent of the building material composition, the cementitious composition comprises about 20 to about 50 weight percent of the building material composition, the organic binder comprises about 1 to about 5 weight percent of the building material composition, and the Portland cement (PC) and the calcium aluminate cement (CAC) are present in the fast setting cementitious composition in a weight ratio (PC:CAC) within the range of 4:1 to 8:1.

5. The building material composition of claim 4 wherein the Portland cement and the calcium aluminate cement are present in the fast setting cementitious composition in a weight ratio (PC:CAC) within the range of 5:1 to 7:1.

6. The building material composition of claim 5 containing a fibrous reinforcement.

7. A building material composition prepared by drying an aqueous mixture of expanded perlite, a fast setting, cementitious composition consisting essentially of a hydraulic cement having (1) a Portland cement and (2) a calcium aluminate cement, and an organic binder, wherein, on a water-free basis, the expanded perlite comprises about 50 to about 75 weight percent of the aqueous mixture, the cementitious composition comprises about 20 to about 50 weight percent of the aqueous mixture, the organic binder comprises about 1 to about 5 weight percent of the aqueous mixture, and the Portland cement (PC) and the calcium aluminate cement (CAC) are present in the fast setting cementitious composition in a weight ratio (PC:CAC) within the range of 4:1 to 8:1.

8. A method for making a slab of building material suitable for making a fire door core from an aqueous mixture of materials, which method comprises mixing water, and as intermixed ingredients expanded perlite, a fast setting cementitious composition consisting essentially of a hydraulic cement having (1) a Portland cement and (2) a calcium aluminate cement, and an organic binder, wherein, on a water-free basis, the expanded perlite comprises about 50 to about 75 weight percent of the aqueous mixture, the cementitious composition comprises about 20 to about 50 weight percent of the aqueous mixture, the organic binder comprises about 1 to about 5 weight percent of the aqueous mixture, and the Portland cement (PC) and the calcium aluminate cement (CAC) are present in the fast setting cementitious composition in a weight ratio (PC:CAC) within the range of 4:1 to 8:1, the expanded perlite having a density less than about 6.5 lb./cu. ft., the water being present in an amount excess of the stoichiometric amount needed to hydrate the fast setting cementitious composition and sufficient to provide a damp mixture but less than an amount which would produce an aqueous slurry of the intermixed ingredients, placing a charge of the damp mixture having an original volume in a pressure mold of slab form, applying sufficient pressure to the charge in the mold to compress the charge into a compressed charge having about 25% to 33% of the original volume and maintaining the pressure until the compression strength of the compressed charge is at least about 50 psi to form a molded slab, removing the molded slab from the mold and thereafter drying the slab by heating it sufficiently to remove excess water.

9. The method as defined in claim 8 in which the organic binder is polyvinyl alcohol.

10. The method as defined in claim 9 in which the intermixed ingredients further include unexpanded vermiculite in an amount not greater than about 4 wt. % of the intermixed ingredients.

11. The method as defined in claim 8 in which the intermixed ingredients further include clay in an amount not greater than about 4 wt. % of the intermixed ingredients.

12. The method as defined in claim 8 which the intermixed ingredients further include fibrous reinforcements in an amount not greater than about 1 wt. % of the intermixed ingredients.

* * * * *

UNITED STATES PATENT AND TRADEMARK OFFICE
CERTIFICATE OF CORRECTION

PATENT NO. : 6,846,358 B2
DATED : January 25, 2005
INVENTOR(S) : Hubert C. Francis It is certified that error appears in the above-identified patent and that said Letters Patent is hereby corrected as shown below:

Column 3,
Line 63, please replace "ocurring" with -- occurring --

Column 5,
Line 58, please replace "steam" with -- stream --

Signed and Sealed this

Twenty-sixth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,846,358 B2
DATED : January 25, 2005
INVENTOR(S) : Hubert C. Francis It is certified that error appears in the above-identified patent and that said Letters Patent is hereby corrected as shown below:

Column 3,
Line 63, please replace "ocurring" with -- occurring --.

Column 5,
Line 58, please replace "steam" with -- stream --.

Signed and Sealed this

Sixteenth Day of August, 2005

JON W. DUDAS
*Director of the United States Patent and Trademark Office*